B. F. SAWYER.
Wrenches.

No. 134,317.                         Patented Dec. 24, 1872.

Witnesses.
Edmund Masson.
John R. Young.

Inventor.
B. F. Sawyer, by
Prindle and Co. his Atty

UNITED STATES PATENT OFFICE.

BENJAMIN F. SAWYER, OF ROME, GEORGIA.

IMPROVEMENT IN WRENCHES.

Specification forming part of Letters Patent No. 134,317, dated December 24, 1872.

*To all whom it may concern:*

Be it known that I, B. F. SAWYER, of Rome, in the county of Floyd and in the State of Georgia, have invented certain new and useful Improvements in Wrenches; and do hereby declare that the following is a full, clear, and exact description thereof, reference being had to the accompanying drawing making a part of this specification, in which—

Figure 1:
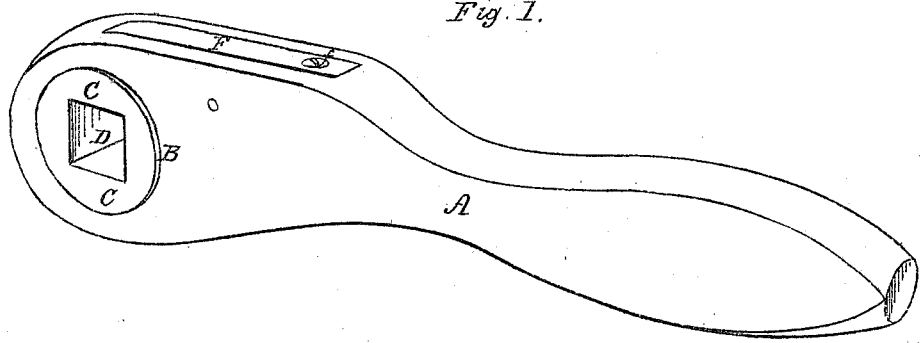
Figure 2:
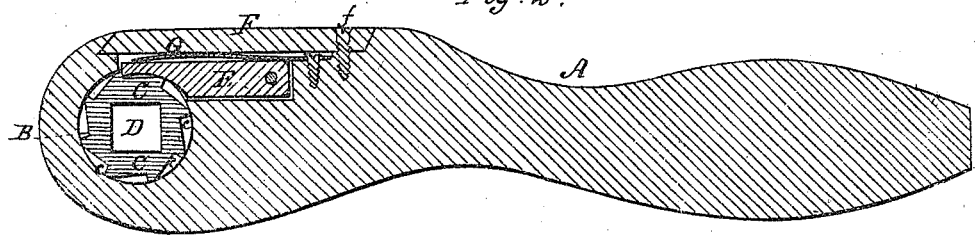
Figure 3:
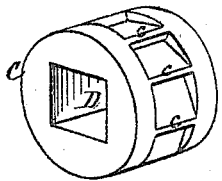

Figure 1 is a perspective view of my improved device; Fig. 2 is a central longitudinal section of the same; and Fig. 3 is a perspective view of the revolving die for embracing a nut or a bolt-head.

Letters of like name and kind refer to like parts in each of the figures.

The design of my invention is to furnish a simple, cheap, and efficient means for turning bolts or nuts without removing and replacing the operating-lever at every motion; and it consists in the device as a whole when its various parts are constructed and combined substantially as and for the purpose hereinafter specified.

In the annexed drawing, A represents the stock of the device, having preferably the form shown, and provided near one end with a circular opening, B, which has a diameter considerably greater than the size of the nuts or bolt-heads that are designed to be operated upon. Fitted loosely to or within the opening B is a corresponding block or die, C, through the center of which is provided an opening, D, that corresponds in size and shape to one style of nuts or bolt-heads, while within the periphery of said block is provided a series of angular notches or teeth, c, which incline in the same direction circumferentially, and have a width somewhat less than the length of said block. A pawl, E, pivoted at one end to or within a suitable groove formed in the stock A, rests upon and at its opposite end engages with the teeth c, and prevents the block C from turning in one direction. The pawl and its slot are inclosed by means of a covering-plate, F, one end of which extends forward and downward, and fits into a corresponding cavity within the stock, while its opposite end is secured in place by means of a screw, f, said screw being the only obstacle to the removal of said plate. A spring, G, placed between the pawl and covering-plate, bears upon the former and holds its forward or free end in contact with the toothed block.

The device is now complete, and is used as follows: The block or die is placed upon or over a nut or bolt-head, and a reciprocating movement given to the rear or free end of the stock, by which means said die and its nut or bolt are caused to rotate in one direction without the necessity, as when ordinary wrenches are employed, of removing and replacing the device at each motion. When it is desired to remove the die for the purpose of inserting one having a different size or shape of opening, said die is revolved until the pawl rests upon the highest portion of a tooth upon a line with the periphery of said die, after which the latter may be readily withdrawn.

The device shown is believed to possess in a marked degree efficiency, durability and simplicity, and, as it can be furnished at a comparatively small cost, its general use is believed to be certain.

Having thus fully set forth the nature and merits of my invention, what I claim as new is—

The hereinbefore-described wrench, consisting of the stock A provided with the opening B, the die C provided with the opening D and teeth c, the pawl E, the covering-plate F, and the spring G, when said parts are constructed, combined, and arranged substantially as and for the purpose specified.

In testimony that I claim the foregoing I have hereunto set my hand this 18th day of October, 1872.

BENJAMIN FRANKLIN SAWYER.

Witnesses:
    JULIUS R. HOWELL,
    TERENCE MCGUIRE.